United States Patent Office 3,271,360
Patented Sept. 6, 1966

3,271,360
POLYMERIC ORGANOSILOXANES
Thomas C. Williams, Lancaster, N.Y., assignor to Union Carbide Corporation, a corporation of New York
No Drawing. Filed Apr. 29, 1963, Ser. No. 276,175
1 Claim. (Cl. 260—46.5)

This invention relates to novel organosilicon compounds and to processes for their production. More particularly, this invention relates to novel unsymmetrical siloxysilanes having hydrolyable groups attached to one of the silicon atoms thereof, to the processes for production of such novel unsymmetrical siloxysilanes and to the novel polymeric and copolymeric polysiloxanes produced therefrom.

The novel unsymmetrical siloxysilanes of this invention are those of the formula:

(1)

wherein R represents a monovalent aliphatic hydrocarbon radical, $R^1$ represents a monovalent hydrocarbon radical, a halogenated monovalent hydrocarbon radical, a cyanoaryl radical or a cyanoalkyl radical in which the cyano group is at least two carbon atoms removed from the silicon atom, and X represents halogen or alkoxy radicals.

Illustrative of the novel compounds of this invention are for example:

trimethylsiloxymethyldichlorosilane,
trimethylsiloxymethylchloroethoxysilane,
trimethylsiloxymethyldiethoxysilane,
triethylsiloxymethyldichlorosilane,
trimethylsiloxychloropropyldifluorosilane,
trimethylsiloxydichlorophenyldichlorosilane,
trimethylsiloxy(gamma-cyanopropyl)diethoxysilane,
trimethylsiloxyphenyldichlorosilane,
trimethylsiloxy(meta-cyanophenyl)diethoxysilane,
trimethylsiloxyvinyldichlorosilane, and the like.

Illustrative of the monovalent aliphatic hydrocarbon radicals that constitute R in the above formula are alkyl groups, such as methyl, ethyl, propyl, butyl, octadecyl and the like; and alkenyl groups, such as vinyl, allyl, butenyl and the like. The R groups can be the same or different radicals throughout the same molecule.

The monovalent hydrocarbon radials that $R^1$ can represent are, for example, alkyl groups and alkenyl groups as described above for R as well as alicyclic groups, such as cyclopentyl, cyclohexyl and the like; aryl groups, such as phenyl, naphthyl and the like; alkaryl groups, such as tolyl, xylyl, ethylphenyl and the like; and aralkyl groups, such as benzyl, phenylethyl, phenylpropyl and the like. When $R^1$ is a monovalent hydrocarbon radical, it can be the same or different from the R radicals, $R^1$ also represents halogenated monovalent hydrocarbon groups, such as chloromethyl, chloroethyl, chloropropyl, fluoropropyl, chlorophenyl, bromophenyl and the like. $R^1$ also represents cyanoalkyl radicals, such as beta-cyanoethyl, gamma-cyanopropyl, delta-cyanobutyl and the like; and cyanoaryl radicals, such as ortho, meta, and para-cyanophenyl and the like. In such cyanoalkyl and cyanoaryl radicals the cyano group is removed at least two carbon atoms from the silicon atom.

The alkoxy radicals that X can represent are, for example, methoxy, ethoxy, butoxy, isopropoxy, octadecyloxy and the like. Preferably, the alkoxy groups that X represents contain from 1 to 6 carbon atoms. The halogen radicals that X can represent are chloro, bromo and fluoro radicals.

The novel unsymmetrical siloxysilanes of the present invention can be prepared in several ways. The preferred process comprises reacting a silanol having the formula $R_3SiOH$ with an organosilane having the formula $R^1SiX_3$ wherein R, $R^1$ and X are as defined above. When the X radicals of the siloxysilane product of Formula 1 are alkoxy, it is preferred that one of the X radicals in the $R^1SiX_3$ starting material be a halogen group. When at least one X radical of $R^1SiX_3$ is a halogen group, the reaction is preferably carried out in the presence of a hydrohalic acid acceptor, such as an amine. The following equation depicts the reaction between trimethylsilanol and methyltrichlorosilane which is illustrative of the general reaction:

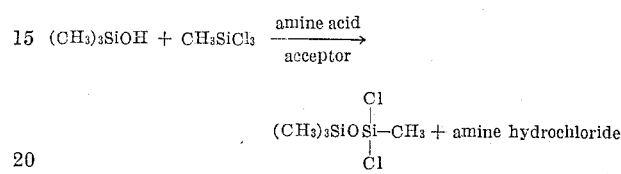

Although it is not essential, it is preferred that the above reaction be conducted by adding the silanol reactant to the silane reactant in order to prevent undesirable side reactions such as the condensation of the silanol with itself. When a hydrohalic acid acceptor is employed, the silanol is preferably added to a mixture of the silane and the hydrohalic acid acceptor.

In carrying out this process at least one mole of the silane having the formula $R^1SiX_3$ is employed for each mole of the silanol of formula $R_3SiOH$. It is preferred to employ from 2 to 10 moles of the silane for each mole of the silanol in order to minimize undesirable side reactions such as the reaction of the more than one halogen or alkoxy radical of the silane with the hydroxyl group of the silanol which might occur if an excess of silanol were present.

As indicated above, when at least one of the X radicals in the $R^1SiX_3$ starting material is a halogen group, hydrogen halide will be formed. It is desirable to remove the hydrogen halide as soon as possible in order to minimize undesirable side reactions. A hydrogen halide acceptor, such as triethylamine, is preferably used to react with the hydrogen halide (hydrohalic acid) and thus promote the primary desired reaction. Other hydrogen halide acceptors could alternatively be used as long as they do not promote undesirable side reactions. Other hydrogen halide acceptors are, for example, tertiary amines, such as trimethylamine, triphenylamine, methylethylphenylamine, pyridine, 2,4,6-collidine, alpha-picoline, 2,5-lutidine and the like, and alkaline earth metal hydroxides, such as calcium hydroxide, magnesium hydroxide and the like.

Where the use of hydrogen halide acceptors is not desirable, the process can be performed under conditions which minimize solubility of hydrogen halide in the reaction mixture. This can be accomplished, for example, by operating at the boiling point of the reaction system or by blowing an inert gas, such as dry nitrogen, through the reaction system. The use of a reaction solvent, such as carbon tetrachloride, in which the hydrogen halide has a low solubility can also be beneficial toward maintaining satisfactory yield of desired products.

Although a solvent is not necessary in conducting the reaction between $R^1SiX_3$ and $R_3SiOH$, it is preferred to employ a solvent in order to substantially or completely eliminate undesirable side reactions, such as the condensation of the silanol with itself. When an amine hydrogen halide acceptor is employed in this process, a solvent helps maintain a desirably low viscosity of the reaction mixture by counteracting the thickening effect of the precipitated amine hydrogen halide. Examples of useful solvents are carbon tetrachloride, acetone, benzene, xylene, tetrahydrofuran, diethyl ether and even an excess of the amine hydrogen halide acceptor, but other known solvents for organosilicon compounds could also be employed. The solvent must be one in which the reactants and the siloxysilane products are soluble and which is not reactive therewith. The amount of the inert organic solvent employed is not critical and can range from 1 part by weight of the solvent for each part by weight of the silanol to 10 parts by weight of the solvent for each part by weight of the silanol. It is preferred to employ from 2 to 4 parts by weight of the solvent for each part by weight of the silanol.

The temperature at which the above-described reaction is conducted can vary over the range of from about 0° C. to about 50° C. However, it is preferred to conduct the reaction at a temperature of about 30° C. to about 50° C. It is further preferred that the reaction mixture be rapidly stirred during the course of the reaction in order to prevent localized overheating due to the exothermic nature of the reaction thereby minimizing undesirable side reactions, such as the condensation of the silanol with itself. After the silanol addition is complete, the reaction mixture is continually stirred until the exothermic reaction has ceased and the mixture has cooled to ambient temperature. This allows the reaction to go to completion and generally takes about one-half hour after silanol addition is complete. The resulting mixture is then vacuum filtered to remove precipitated amine hydrochloride (if an amine acid acceptor was employed) and the filtrate is stripped of solvent and any unreacted $R^1SiX_3$ starting material by heating to a low temperature (under about 100° C.) under reduced pressure (about 40 mm. Hg, for example). The stripped residue is then vacuum distilled to obtain the desired unsymmetrical siloxysilane product.

The silanol and silane starting materials in the above-described novel process for producing novel unsymmetrical siloxysilane products are well-known compounds prepared by well-known techniques. The $R_3SiOH$ type silanol compounds are illustrated by trimethylsilanol, triethylsilanol, dimethylethylsilanol, vinyldimethylsilanol, allylmethylethylsilano, trivinylsilanol and the like. These silanol starting materials can be prepared by rapidly pouring a mixture of $R_3SiCl$ and an acid acceptor, such as triethylamine, into an ice-water mixture with rapid stirring. The $R^1SiX_3$ type silane compounds are illustrated by methyltrichlorosilane, ethyltrifluorosilane, phenyltriethoxysilane, methyldimethoxychlorosilane and the like. The compounds wherein all the X radicals are halogen can be prepared by reaction of hydrocarbon halides with silicon. The alkoxy containing material can be prepared by reacting alcohols with the above prepared trihalosilanes.

The novel unsymmetrical siloxysilanes of the invention as shown by Formula 1 wherein both X radicals are alkoxy radicals can be prepared by an alternate process. This process comprises equilibration of a mixture of $R^1SiX_3$ and $R_3SiOSiR_3$ in the presence of an alkali metal alkoxide, alkali metal hydroxide or alkali metal silanolate, wherein R and $R^1$ are defined above and X are alkoxy radicals. This reaction is depicted below by the equilibration of hexamethyldisiloxane and methyltriethoxysilane in the presence of cesium hydroxide.

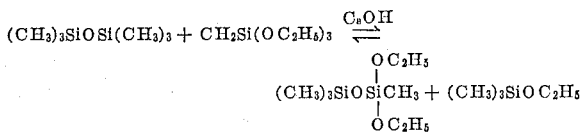

The novel unsymmetrical siloxysilanes of this invention can be hydrolyzed and condensed by well-known techniques to form polymeric organosiloxanes consisting essentially of units of the formula:

wherein R and $R^1$ in Formula 2 above have the meanings defined above for Formula 1. The silicon atoms of the polymeric organosiloxanes having the unit formula expressed in (2) are connected to each other through silicon-oxygen-silicon linkages. That is, the polymeric organosiloxanes are compounds having formulas of the type:

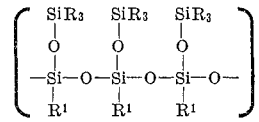

Such polymeric organosiloxanes can exist as linear organosiloxanes such as oils or gums, or cyclic organosiloxanes. The linear organosiloxanes comprise a chain of units having the unit Formula 2 with each end of the chain terminated with a nonovalent radical, such as hydroxyl, alkoxy, triorganosiloxy, and the like. Such linear organosiloxanes are illustrated by methoxy end-blocked trimethylsiloxymethylpolysiloxanes, $$CH_3O[(CH_3)_3SiOSi(CH_3)O]_yCH_3$$

hydroxy end-blocked triethylsiloxyphenylpolysiloxanes, $HO[(C_2H_5)_3SiOSi(C_6H_5)O]_yH$, trimethylsiloxy end-blocked trimethylsiloxy(beta-cyanoethyl)polysiloxanes, $(CH_3)_3SiO[(CH_3)_3SiOSi(CH_2CH_2CN)O]_ySi(CH_3)_3$ and the like, wherein ($y$) has a value of at least 3.

The cyclic organosiloxanes that are produced by hydrolysis and condensation of the novel unsymmetrical siloxysilanes of the present invention are those of the formula:

wherein R and $R^1$ have the above-defined meanings for Formula 1 and ($w$) is an integer having a value of 3 to 7 inclusive. Such cyclic organosiloxanes are, for example, tetra(trimethylsiloxy) tetramethylcyclotetrasiloxane, tetra(triethylsiloxy)tetraphenylcyclotetrasiloxane, penta(triethylsiloxy) - penta(gamma-cyanopropyl)cyclopentasiloxane and the like.

The novel unsymmetrical siloxysilanes can also be cohydrolyzed and condensed with silanes of the formula:

$$R_n^1SiX_{4-n} \qquad (4)$$

wherein $R^1$ and X are defined above and ($n$) is an integer having a value of 1 to 3 inclusive, to produce copolymeric organosiloxanes consisting essentially of from 0.001 to 99.999 mole percent of units of Formula 2 and from 99.999 to 0.001 mole percent of units of the formula:

$$R_n^1SiO_{4-n/2} \qquad (5)$$

wherein $R^1$ and ($n$) are as defined above. In such copolymeric siloxanes $R^1$ can represent the same or different groups as defined above within the same copolymeric molecule and ($n$) need not have the same value throughout the same molecule. That is, the copolymeric organosiloxane can contain mono-, di-, and tri-functional units of Formula 5 in the copolymeric molecule. Thus, the copolymeric organosiloxanes include copolymeric linear organosiloxane oils, copolymeric cyclic siloxanes, copolymeric cross-linked resinous siloxanes; and copolymeric organosiloxane gums.

The copolymeric linear organosiloxane oils of this invention include those having the formula:

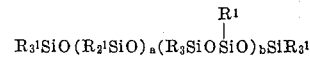

where R and $R^1$ have the above-defined meanings, ($a$)

is a number having a value of at least 0, (*b*) is a number having a value of at least 1, and the sum of $(a)+(b)$ is at least 1. That is, the value of $(a)$ can be as low as 0 or as high as 10,000 or even higher. These linear organopolysiloxane oils are, for example, trimethylsiloxy end-blocked-dimethylsiloxane - (trimethylsiloxy)phenylsiloxane oils; triphenylsiloxy end-blocked-diphenylsiloxane-(trimethylsiloxy)methylsiloxane oils; tributylsiloxy end-blocked-phenylmethylsiloxane - (triethylsiloxy)ethylsiloxane oils; and the like. These oils are useful as lubricants and fluids for gauges, shock absorbers and the like.

The copolymeric cyclic organosiloxanes include, for example, (trimethylsiloxy)heptamethylcyclotetrasiloxane; (triethylsiloxy)pentaphenylcyclotrisiloxane; (trimethysiloxy)nonomethylcyclopentasiloxane; and the like.

The copolymeric organosiloxane gums of this invention are copolymeric organosiloxanes consisting essentially of from 0.001 to 99.999 mole percent units of formula 2 and from 99.999 to 0.001 mole percent units of formula:

$$(R_2^1SiO) \qquad (6)$$

where $R^1$ has the above-defined meaning. Preferably the copolymeric organosiloxane gums consist essentially of from 1.0 to 20.0 mole percent units of Formula 2 and from 99.0 to 80.0 mole percent units of Formula 6. Preferred organosiloxane gums wherein the units of Formula 6 are dimethylsiloxane units when compounded with a filler and curing catalyst and cured under heat and pressure yield elastomers having exceptionally good low temperature properties. Such elastomers retained their elastomeric properties at a temperature as low as $-180°$ F.

An alternate procedure can also be used to prepare the copolymeric organosiloxanes containing units of Formulas 2 and 5. The unsymmetrical siloxysilane of Formula 1 can be condensed with a hydroxy end-blocked siloxane having units of Formula 6. When the unsymmetrical siloxysilane contains alkoxy groups, the siloxysilane is first hydrolyzed and then condensed with a hydroxy end-blocked organosiloxane. This reaction can be depicted by the following equation which illustrates the reaction between (trimethylsiloxy) methyldichlorosilane and a hydroxy end-blocked dimethylpolysiloxane:

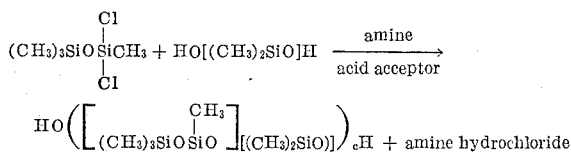

where (*c*) has a value of at least 1.

When a trihydrocarbonsiloxy end-blocked copolymeric organosiloxane oil is desired, the above prepared hydroxy end-blocked copolymeric organosiloxane is reacted with a trihydrocarbonhalosilane in the presence of an acid acceptor to yield a copolymeric organosiloxane oil having trihydrocarbonsiloxy chain terminating groups.

When a copolymeric organosiloxane gum is desired, the above prepared hydroxy end-blocked copolymeric organosiloxane is condensed by heating it in the presence of, for example, 10 weight percent sulfamic acid at 150° C. for about 3.5 hours.

In order to prepare novel siloxane elastomers from the polymeric and copolymeric organosiloxane gums of this invention, the gum is mixed with suitable fillers and curing agents on standard differential rubber rolls, for example, until a thorough admixture is obtained. The gum-filler-catalyst mixture is then formed into the desired shape and molded under the influence of heat and pressure. The resulting elastomer then may be further cured or heat-treated in an oven, if desired.

In producing the siloxane elastomers of this invention one can employ as curing catalysts, organic peroxides such as the alkylperoxides. Especially suitable curing agents are the dialkyl peroxides which can be graphically depicted by the formulas:

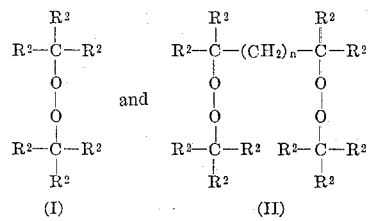

wherein $R^2$ represents the same alkyl group throughout or alkyl groups of two or more different types and $n$ is zero (0) or a larger integer.

Among the specific curing agents that I prefer to employ when the gum contains olefinically unsaturated hydrocarbon groups are included:

di-tertiary-butyl peroxide;
tertiary-butyl-triethylmethy peroxide;
tertiary-butyl-tertiary-triptyl peroxide, which is represented by the structural formula:

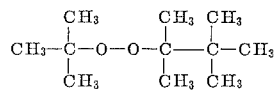

and dicumyl peroxide.

Where the organosiloxane gum contains no elefinically unsaturated hydrocarbon groups it is preferred to employ organic peroxides such as dibenzoyl peroxide, 2,4 dichlorobenzoyl peroxide, tertiarybutyl perbenzoate and the like.

The amount of the curing catalyst employed in producing the siloxane elastomers of this invention can be from 0.5 part catalyst per 100 parts of the siloxane gums to 5.0 parts catalyst per 100 parts gum. It is preferred to employ from 1.0 to 2.0 parts catalyst per 100 parts of the siloxane gum in order to obtain fully cured elastomers.

Among the fillers which may be employed in the production of the elastomers of this invention are inorganic fillers, for example, lithopone, ferric oxide, titanium dioxide, finely divided silica and the like; and various forms of carbon such as finely divided and colloidal carbon, for example, carbon black such as, channel black, gas black, furnace carbon, acetylene black, and the like. The fillers may be incorporated in the elastomer in amounts ranging from 10 to 90 parts by weight filler per 100 parts by weight of the organopolysiloxane gum. It is preferred to employ the filler in amounts of from 25 to 50 parts by weight filler per 100 parts by weight of the organopolysiloxane gum.

The following examples serve to further illustrate the invention.

*Example I*

Equimolar amounts of $CH_3Si(OC_2H_5)_3$ and $(CH_3)_3SiOSi(CH_3)_3$ ar heated to reflux (about 118° C.) with 0.2 weight percent cesium hydroxide. After the reflux temperature dropped indicating the formation of $(CH_3)_3Si(OC_2H_5)$ as a by-product, the trimethylethoxysilane was distilled off to force the reaction toward completion. After one quarter of the stoichiometric amount of trimethylethoxysilane had been removed, the cesium hydroxide catalyst was inactivated by adding solid carbon dioxide and filtered out of the reaction mixture. The resulting filtrate was vacuum distilled yielding 6 mole percent (based on the moles of reactants) of $(CH_3)_3SiOSi(CH_3)(OC_2H_5)_2$ having an index of refraction of $n_D^{25}=1.3837$. Gas chromatography analysis indicated the unsymmetrical siloxysilane product had a purity of greater than 99.7 weight percent.

*Example II*

Trimethylsilanol was prepared by mixing at room temperature 108.5 g. (1 mole) of distilled trimethylchlorosilane with 101 g. (1 mole) of anhydrous triethylamine and then pouring the resulting cloudy mixture into stirred ice water as quickly as the vigorous reaction would allow. A neutral solution was maintained throughout the reaction by alternate additions of small amounts of trimethylchlorosilane and triethylamine. After hydrolysis was complete an oil layer settled out. This oil layer was identified by its refractive index of $n_D^{25}=1.3850$ to be trimethylsilanol. The trimethylsilanol was dissolved in diethyl ether and the ethereal solution dried over anhydrous calcium sulfate. To a 3-liter reaction vessel fitted with a stirrer, an air-cooled reflux condenser and an addition funnel was added a solution of methyltrichlorosilane (299 g., 2 moles) and pyridine (79 g., 1 mole). The above prepared and dried ethereal solution of trimethylsilanol was added to the methyltrichlorosilane-pyridine solution in the vessel with stirring while maintaining the temperature of the mixture at a temperature of from about 25° C. to about 50° C. This stirring was continued for only a few minutes after the ethereal solution addition was complete. The resulting reaction mixture was filtered to remove precipitated amine hydrochloride and the filtrate was stripped of the diethyl ether by vacuum distillation (about 40 mm. Hg). Care was taken so that the temperature of the distillation did not exceed 70° C., since the trimethylsiloxymethyldichlorosilane product is not stable at temperatures of 100° C. or higher. The 56 g. of the above-described product had the properties of B.P. 40–44° C./41 mm. Hg, $n_D^{25}=1.3978$ and density of $d^{25}=1.0260$.

*Example III*

Trimethylsilanol was reacted with methyldiethoxychlorosilane according to the procedure of Example II above. The methyldiethoxychlorosilane was prepared by controlled reaction between methyltrichlorosilane and ethanol. Trimethylsiloxymethyldiethoxysilane in 34 mole percent yield (based on moles of silanol starting material) was obtained having properties of B.P. 91–93° C./38.6 mm. Hg; $n_D^{25}=1.3837$; $d^{25}=0.8715$.

*Example IV*

The trimethylsiloxymethyldichlorosilane prepared according to the procedure of Example II above (13.3 g.) was dissolved in 100 g. of tetrahydrofuran and 13.3 g. of anhydrous pyridine. This solution was added dropwise to a dimethylpolysiloxane having one hydroxy group bonded to each of the terminal silicon atoms thereof and containing 2.2–2.7 weight percent hydroxy groups. After the addition was finished the mixture was stirred for 1½ hours to complete the reaction. The reaction mixture was washed with four separate 100 cc. portions of distilled water. The reaction mixture was then subjected to a vacuum evaporation to remove the tetrahydrofuran solvent, yielding an oily residue. This oily residue was dissolved in n-hexane and dried over calcium sulfate. The hexane solvent was then removed by vacuum evaporation yielding a clear white copolymeric organosiloxane oil as the product. This oil was then condensed to a gum by heating 100 parts by weight of the oil with 10 parts by weight of sulfamic acid at 150° C. for 3.5 hours.

*Example V*

The gum stock prepared in Example IV above (90 g.) was charged onto a two-roll differential water-colled rubber mill and milled at ambient temperature. Finely divided silica filler (40 g.) was added and the mixture milled until a homogeneous dispersion was obtained. Benzoyl peroxide curing catalyst (2.0 g.) was then added to the homogeneous dispersion and the milling continued until a homogeneous mixture (gum compound) of gum, filler and curing catalyst was obtained. Total milling time was about 20 minutes. After 2 days storage the gum compound was remilled and a sheet produced having an approximate size of 6 inches x 6 inches x 0.075 inches. This sheet was placed in a pressure mold and cured to an elastomer at 250° F. under 5000 p.s.i.g. pressure for 15 minutes. The resulting cured elastomer was cooled to room temperature and its properties measured. This cured elastomer had a hardness (Shore A durometer) of 31, an elongation of 30 percent, and a tensile strength of 230 p.s.i. This elastomer was tested at low temperatures in a Gehman twist apparatus and had the following properties:

178° twist at −155° F.
173° twist at −165° F.
114° twist at −182° F.

These low temperature properties are exceptionally good.

What is claimed is:

A cyclic polymeric organosiloxane compound of the formula:

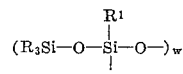

wherein R is a monovalent aliphatic hydrocarbon radical, $R^1$ is a member of the class consisting of monovalent hydrocarbon radicals, halogenated monovalent hydrocarbon radicals, cyanoalkyl radicals and cyanoaryl radicals in which the cyano group of the cyanoalkyl and cyanaryl radicals is at least two carbon atoms removed from the silicon atom and ($w$) is an integer having a value from 3 to 7 inclusive.

References Cited by the Examiner

UNITED STATES PATENTS

| | | | |
|---|---|---|---|
| 2,469,888 | 5/1949 | Patnode | 260—46.5 |
| 2,486,162 | 10/1949 | Hyde | 260—46.5 |
| 2,698,314 | 12/1954 | Rust | 260—46.5 |
| 2,827,474 | 3/1958 | Kress | 260—448.8 |
| 2,881,199 | 3/1959 | Bailey et al. | 260—448.8 |
| 3,012,052 | 12/1961 | Simmler | 260—448.2 |
| 3,036,035 | 5/1962 | Riley | 260—448.2 |
| 3,037,962 | 6/1962 | Hartung et al. | 260—46.5 |
| 3,065,252 | 11/1962 | Brown et al. | 260—448.2 |
| 3,105,061 | 9/1963 | Bruner | 260—448.2 |
| 3,183,205 | 5/1965 | Bailey et al. | 260—46.5 |

OTHER REFERENCES

Andrianov et al.: Doklady Akad. Nauk S.S.S.R., 126, pp. 997–1000 (1959).

LEON J. BERCOVITZ, *Primary Examiner.*

SAMUEL H. BLECH, *Examiner.*

M. I. MARQUIS, *Assistant Examiner.*